(12) United States Patent
Danielsson

(10) Patent No.: US 8,240,590 B2
(45) Date of Patent: Aug. 14, 2012

(54) FISHING REEL

(75) Inventor: Tomas Erik Danielsson, Smedjebacken (SE)

(73) Assignee: Danielsson Innovation AB, Smedjebacken (SE)

( * ) Notice: Subject to any disclaimer, the term of this patent is extended or adjusted under 35 U.S.C. 154(b) by 0 days.

(21) Appl. No.: 12/526,284

(22) PCT Filed: Jan. 28, 2008

(86) PCT No.: PCT/SE2008/050109
§ 371 (c)(1),
(2), (4) Date: Nov. 9, 2010

(87) PCT Pub. No.: WO2008/097176
PCT Pub. Date: Aug. 14, 2008

(65) Prior Publication Data
US 2011/0049282 A1    Mar. 3, 2011

(30) Foreign Application Priority Data
Feb. 9, 2007 (SE) ........................ 0700313

(51) Int. Cl.
*A01K 89/02* (2006.01)
(52) U.S. Cl. ........ 242/317; 242/265; 242/266; 242/295; 242/303
(58) Field of Classification Search ............ 242/246, 242/265, 266, 291, 295, 303, 317
See application file for complete search history.

(56) References Cited

U.S. PATENT DOCUMENTS

| | | | |
|---|---|---|---|
| 2,977,065 A | 3/1961 | Holahan | |
| 3,572,607 A | 3/1971 | Wilson | |
| 3,604,658 A | 9/1971 | Nurmse | |
| 3,720,386 A | 3/1973 | Morner | |
| 4,280,369 A | 7/1981 | Pouliot | |
| 4,526,331 A * | 7/1985 | Tunks | 242/266 |
| 4,657,201 A * | 4/1987 | Munroe | 242/265 |
| 4,750,687 A * | 6/1988 | Sievert et al. | 242/295 |
| 5,199,682 A * | 4/1993 | James | 242/295 |
| 5,560,562 A * | 10/1996 | Hartmann | 242/255 |
| 6,095,311 A | 8/2000 | Henschel | |
| 6,193,182 B1 | 2/2001 | Capra | |
| 6,964,388 B1* | 11/2005 | Ritter | 242/291 |
| 7,694,907 B2* | 4/2010 | Chivarov et al. | 242/303 |

FOREIGN PATENT DOCUMENTS

SE    320 538    2/1970

OTHER PUBLICATIONS

European Search Report from corresponding European Application No. 08705374.0 dated Jan. 27, 2010.
Supplementary European Search Report and Annex for corresponding EP Application No. 08705374.0 dated Feb. 18, 2011.

* cited by examiner

*Primary Examiner* — Emmanuel M Marcelo
(74) *Attorney, Agent, or Firm* — Merchant & Gould P.C.

(57) ABSTRACT

A fishing reel (100) comprises a crank (110), a spool (120) connected to said crank (110), a pull-off brake mechanism (230,230,400,400,400) and a chassis (130). The pull-off brake mechanism (230,230,400,400,400) 5 and the crank (110) are interconnected such that a pretension of the pull-off brake mechanism (230,230,400,400,400) increases as the crank (110) is moved in a reeling-in direction. Moreover, the pretension of the pull-off pull-off brake mechanism (230,230, 400,400,400)10 also increases as the crank (110) is moved in a direction opposite to the reeling-in direction.

4 Claims, 4 Drawing Sheets

FISHING REEL

This application is a National Stage Application of PCT/SE2008/050109, filed 28 Jan. 2008, which claims benefit of Serial No. 0700313-0, filed 9 Feb. 2007 in Sweden and which applications are incorporated herein by reference. To the extent appropriate, a claim of priority is made to each of the above disclosed applications.

FIELD OF THE INVENTION

The present invention relates to a fishing reel comprising a crank, a spool connected to said crank, a pull-off brake mechanism and a chassis. The pull-off brake mechanism and the crank are interconnected such that a pretension of the pull-off brake mechanisms increases as the crank is moved in a reeling-in direction

PRIOR ART

In the art of fishing with a rod and a reel, a very important feature of the reel is to provide a pull-off brake for the line; the pull-off brake prevents the line from breaking if a fish makes a rush, i.e. is struck by panic and tries to avoid his destiny by forcefully trying to swim in a direction that is opposite to the wish of the fisher.

The pull-off brake also serves as a means for the fisher to tire the fish to a degree where it is not resisting being pulled out from its element, i.e. the water.

In a standard fishing reel, the pull-off brake is mechanically situated between a crank used to maneuver, i.e. reel in or let out line, the fishing reel and a spool housing the line. This means that it is impossible to apply a larger reel-in force than allowed by the pull-off brake setting. If the pull-off brake setting is very low, this might lead to problems reeling in a fish ready for reeling in. Of course, it is possible to adjust the pull-off brake setting prior to reeling in, but this is often connected with some effort.

For fly-fishing reels, the problem with the pull-off brake setting is even more aggravated than for other fishing reels. Fly-fishing reels have namely usually no release mechanism allowing the line to be reeled out; instead, the fisher usually pulls out the line manually, against the force of the pull-off brake. Consequently, the fisher might be tempted to set the pull-off brake to an as low setting as possible, which might lead to problem when the pull-off brake is actually needed.

U.S. Pat. No. 6,095,311 discloses a fishing reel wherein the pull-off brake force can be adjusted by moving the crank in a reeling in direction. The adjustment is achieved by the provision of small balls positioned squeezed between inclined planes of a disc connected to the crank and inclined planes on two discs connected to a pull-off brake of the reel. Whenever there is a torque (in the reeling in direction) applied to the disc connected to the crank, the balls will move on the inclined planes and force the discs apart. The force forcing apart the discs is transferred to the pull-off brake, which will be adjusted to transfer a larger torque without slipping.

There are however a number of disadvantages connected with the fishing reel disclosed in U.S. Pat. No. 6,095,311:

Firstly, there is no limit for the size of the force forcing apart the discs provided in the fishing reel of U.S. Pat. No. 6,095,311. This means that the discs or the pull-off brake easily could be overloaded. Secondly, no effect on the pull-off brake is achieved if the crank is moved in the opposite direction, i.e. against the reeling in direction. Thirdly, the discs controlling pull-off brake force and the pull-off brake itself of the fishing reel of U.S. Pat. No. 6,095,311 are placed close to the crank, which makes the design unnecessarily "bulky".

SUMMARY OF THE INVENTION

The invention solves these and other problems by providing a fishing reel having the function of increasing a pull-off brake force if the crank is moved in either direction.

BRIEF DESCRIPTION OF THE DRAWINGS

Below, a preferred embodiment of the invention will be described in detail with reference to the appended drawings, wherein.

DESCRIPTION OF EMBODIMENTS

Figure 1:
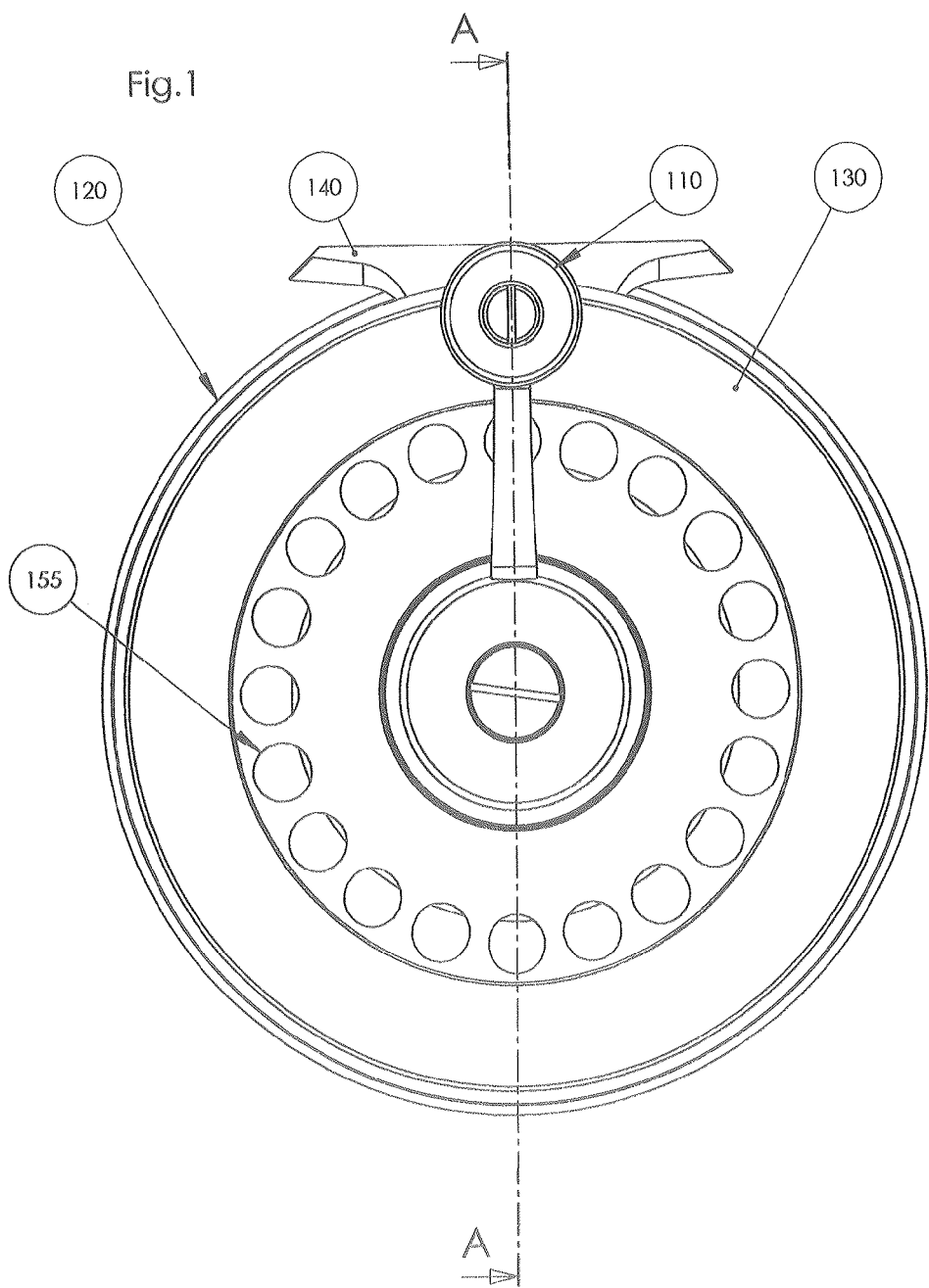
FIG. 1 is a plan view of a fishing reel of the present invention.

Referring to FIG. 1, a fishing reel 100 according to the present invention comprises a crank 110, operatively connected to a spool 120, the spool being intended to house a line during fishing and to provide a reeling-in help for landing large and powerful fish. The spool is housed within a chassis 130, which preferably is provided with a fastening device 140 for attachment to a fishing rod (not shown). In a preferred embodiment, the chassis is provided with openings 155. The openings provide a means for allowing the line to dry, and also reduce the weight of the fishing reel 100.

Figure 2:
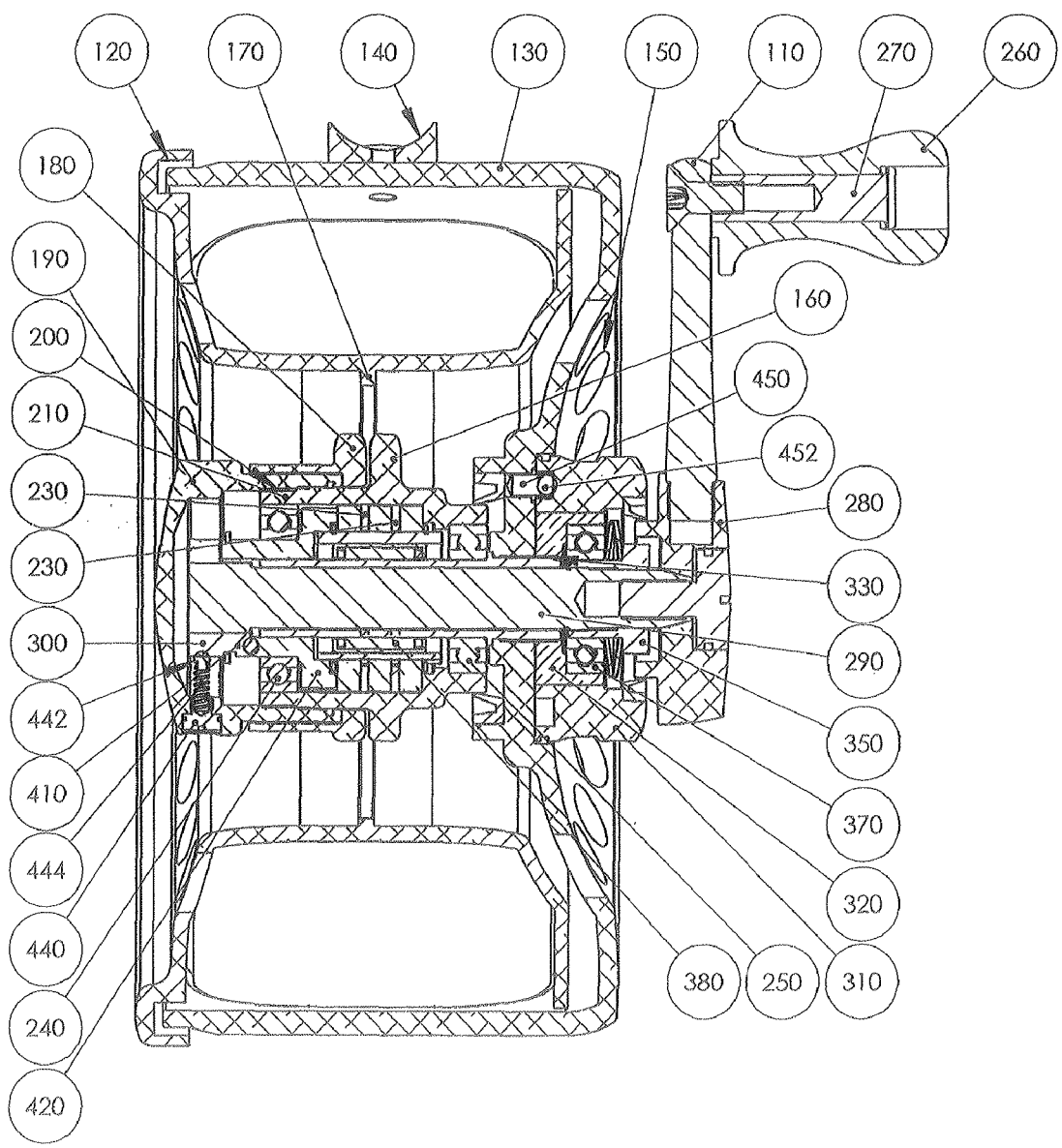
FIG. 2 is a section view of the fishing reel of the present invention, taken along the line A-A in FIG. 1.
Figure 3:
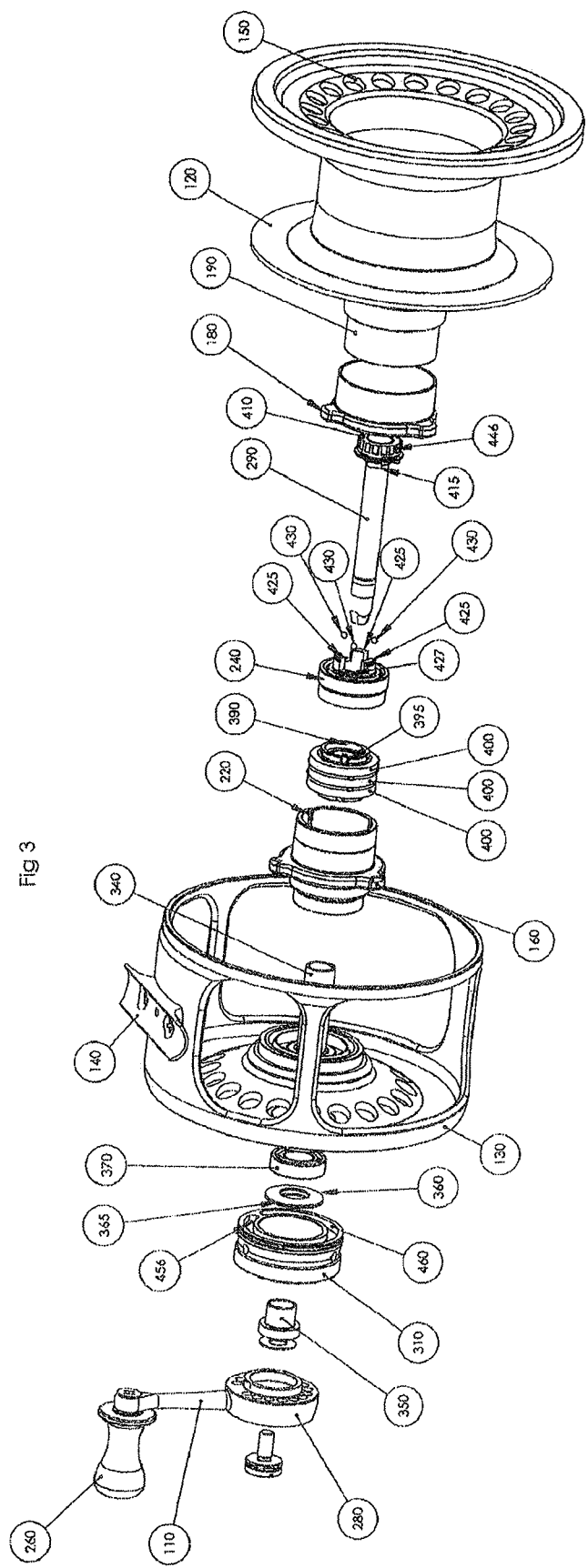
FIG. 3 is an exploded view of the fishing reel according to the present invention and FIG. 4 is a perspective view of a prior art fishing reel that could be provided with a pull-off brake according to the present invention.

In FIGS. 2 and 3, a mechanism providing the necessary functions of the fishing reel 100 according to the invention is shown. In order to obtain the proper function of the reel, there are some components that always corotate with the spool 120 and some components that are fixed relative to the chassis 130. Other components corotate with the spool in one rotational direction of the spool and are fixed relative to the housing in the other rotational direction of the spool. In order to simplify the understanding of the invention, all components corotating with the spool in both directions will be described first.

The spool 120 is connected to a hub 160 by ears 170 (FIG. 2) that are squeezed between a squeeze ring 180 and surfaces arranged on the hub 160. The squeeze ring 180 is biased to squeeze the ears by a cover 190, which is provided with an internal thread 200 cooperating with a corresponding outer thread 210 provided on the hub 160.

An inner circumferential surface of the hub 160 is provided with axial grooves 220 (FIG. 3). The grooves 220 cooperate with brake plates 230, 230' such that the brake plates always will follow the rotation of the spool 120. The hub 160 is journalled on first and second ball bearings 240, 250, respectively, wherein the outer peripheries of the bearings always follow the rotation of the spool.

The above components do always follow the rotation of the spool, regardless of direction. Below, components that follow the spool rotation in one direction will be described. These components do always follow the rotation of the crank 110.

Starting from the right in FIG. 2, one end of the crank 110 comprises a handle 260 journalled on a pin 270. The other end of the crank is attached to a crank hub 280. The crank hub 280 is in turn fastened to an elongate shaft 290, e.g. by a cone connection, which shaft extends from the crank hub 280 to a torque converter 300, the function of which will be described below.

There are also some components being fixed or almost fixed relative to the chassis 130, which components are vital to the function of the fishing reel 100 according to the invention. Starting from right in FIGS. 2 and 3, a pull-off brake adjusting knob 310, which is fastened to a pull-off brake adjuster 320 is shown; both the adjusting knob and the pull-off brake adjuster are arranged coaxially with the shaft 290. The pull-off brake adjuster 320 is threaded on an end 330 of a hollow shaft 340. The hollow shaft is threaded into an opening of the chassis 130 and extends from the pull-off brake adjuster 320 to the torque converter 300.

A sleeve-shaped brake pretensioner 350 is threaded on the end of the elongate shaft 290 and biases two spring washers 360, 365 (FIG. 3) against a third ball bearing 370. The third ball bearing journals the elongate shaft 290 in relation to the pull-off brake adjuster 320, via the brake pretensioner 350.

Moreover, there is a one-way bearing 380, i.e. a bearing allowing for rotation in one direction and stopping rotation in the other direction, provided on the outside of the hollow shaft 330. This bearing journals a brake ring 390, which is provided with external ridges 395 (FIG. 3 only) for cooperating with corresponding grooves provided in inner surfaces of three brake pads 400, 400', 400".

The torque converter 300 comprises a crown 410 fastened to the elongate shaft 290, a control sleeve 420 and three balls 430 (only one ball shown in FIG. 2). The crown 410 comprises three protrusions 415 facing toward the control sleeve 420, and the control sleeve comprises three identical and equidistant protrusions 425, 425', 425" facing toward the crown. The radial extension of the protrusions is such that a certain amount of angular movement between the crown and the control sleeve is possible. The protrusions of the crown are, on their surface facing the control sleeve, each provided with a groove (not shown), that is deepest in a central region, and the surfaces between the protrusions of the control sleeve are provided with equal grooves 427. In an operational position, the balls 430 are placed between the grooves of the protrusions of the crown 430 and the grooves provided between the protrusions of the control sleeve 420.

Hereinafter, the function of the fishing reel 100 according to the present invention will be described with reference to the above components.

In a "ready-to fish" setting, the brake pretensioner 350 is threaded onto the elongate shaft 290 with a force large enough to get a minimal pull-off brake force setting of the pull-off brake; as is well known by persons skilled in the art of fishing, such pull-off brake force is preferably low enough to avoid a line break in case of a fish struggling against being reeled in, but large enough to offer a resistance to the fish pulling out the line, such that the fish will be tired enough to allow for reeling in.

The pull-off brake force of the fishing reel according to the present invention is emanating from friction between the brake pads 400, 400', 400" and the brake plates 230, 230'; as mentioned earlier, the brake plates are connected to the spool 120, and the brake pads 230, 230' are connected to the brake ring 390, which is journalled on the hollow shaft 340 by the one-way bearing 380. Hence, if the spool, e.g. by a fish pulling the line, is urged to rotate in a direction not allowed by the one-way bearing 380, there will be a movement between the brake plates and the brake pads. This movement causes a braking friction between the brake plates and the brake pads.

In order to alter the friction between the brake plates and the brake pads, a force pressing the plates and pads towards one another is altered. The force is transferred from the brake pretensioner 350, via the spring washers 360, 365, the pull-off brake adjuster 320, the elongate shaft 290, the crown 41, the balls 430 and the control sleeve 420 to the assembly of brake pads and brake plates; hence, the force compressing the brake pad and brake plate assembly equals the force compressing the spring washers 360, 365. Preferably, the brake pretensioner is set to give a very small compression force.

In order to adjust the force, and hence the friction between the brake pads and the brake plates, three different methods could be used:

The first method is to control the force by rotating the pull-off brake adjuster 320, such that the threads mounting the pull-off brake adjuster 320 to the chassis 130 will be screwed in or out, hence decreasing or increasing the pull-off brake force, respectively.

The second way to increase the pull-off brake force is to maneuver the crank 110 in the "reeling in" direction. Such movement will transfer a torque to the torque converter 300, which torque will induce a rotational movement between the crown 410 and the control sleeve 420. The rotational movement between the crown 410 and the control sleeve 420 will displace the position of the mutual positioning of the grooves provided at the top of the protrusions if the crown 410 and the grooves of the surfaces between the protrusions of the control sleeve. As mentioned, the grooves are deeper in a central region, and the balls 430 are placed in contact with two oppositely situated grooves. Hence, a rotational movement will force the crown 410 and the control sleeve 420 away from one another, since the space for the ball will decrease in case the grooves provided at the top of the protrusions if the crown 410 and the grooves of the surfaces between the protrusions of the control sleeve are displaced. The increased distance between the crown and the control sleeve will increase the pull-off brake force, due to the force transmission describe above with reference to the function of the pretensioner 350.

The third way to adjust the pull-off brake force is to move the crank 110 in an opposite direction compared to the "reeling-in" direction. This will have exactly the same effect as moving the crank 110 in the "reeling in" direction, i.e. increasing the pull-off brake force due to the balls 430 forcing the crown and control sleeve away from one another.

The third way of adjusting the pull-off brake force will prove valuable when it comes to tiring a fish resisting being reeled in; although it is possible to adjust the pull-off brake by moving the crank in the "reeling-in" direction during fish tiring, it has sometimes proven to be cumbersome to withhold a proper and even braking force in case the fish should be lively.

In order to allow the line to dry, the spool 120 might be provided with openings 150. The openings also serve as a means for reducing the weight of the fishing reel 100.

In one embodiment of the invention, first signal means 440 might be provided for emitting a sound signal for signaling a rotating spool rotating against the force of the pull-off brake. The first signal means may comprise a ball 442 suspended from an internal surface of the cover 190 by a coil spring 444, wherein the ball 442 and the coil spring 444 are arranged to hold the ball against a toothed surface 446 of the crown.

In another embodiment of the invention, an additional second signal means 450 might be provided for signaling maneuvering of the pull-off brake adjusting knob 310. The signal means might comprise a ball 452 which is urged against a toothed surface 456 of the pull-off brake adjusting knob 310. In order to avoid overtightening or overloosening of the pull-off brake adjusting knob, a wall 460 (FIG. 3) might be added on the toothed surface, wherein the wall 460 will cooperate with the ball 452 for avoiding the pull-off brake adjusting knob from being rotated more than one revolution.

Figure 4:
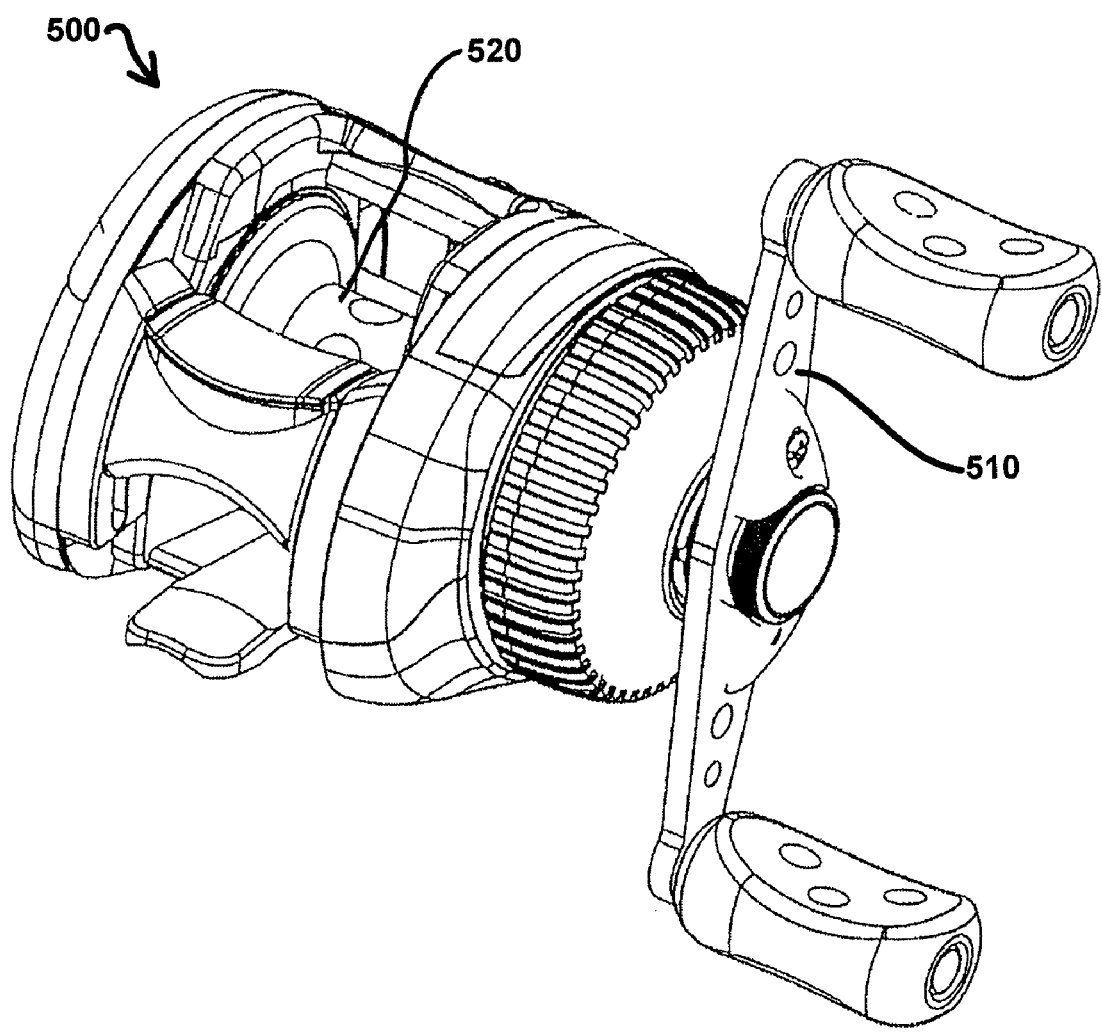

In still another embodiment of the invention, the earlier described mechanism providing a controllable pull-of brake force is used for a bait cast reel. A prior art bait cast reel 500 is shown in FIG. 4. The bait cast reel 500 comprises a crank 510, connected via a gearbox (not shown) to a spool 520. A control knob 530 is operatively connected to the spool, such that the spool is released when the control knob is maneuvered. In some bait cast reels, the control knob has the further function of locking the spool while being pressed down, and release the spool as it is released; this feature makes casting of a bait simpler (on bait cast reel not having this type of function of the control knob, the user must lock the spool using his thumb after the control knob has been maneuvered).

According to the present invention, a prior art bait cast reel may be provided with a mechanism providing the same features, i.e. adjustability of the brake force by moving the crank 510 in a forward or backward direction. In a bait cast reel, the braking arrangement according to the preset invention can be fit in two different positions, namely A benefit of the reel 100 of the present invention is that it is fairly easy to change the reeling in direction from one side to the other; the only measure that has to be taken is to disassemble the reel, dismount the one-way bearing 380 from the hollow shaft 340, turn the one-way bearing 380 one hundred and eighty degrees and mount it to the hollow shaft 340. The one hundred and eighty degree turn of the one-way bearing will allow the bearing to rotate in the opposite direction; hence, it is possible to turn the reel from "right-hand drive" "left-hand drive".

Of course, there are many modifications possible without departing from the scope of the invention such as it is defined in the dependent claims.

The invention claimed is:

1. A fishing reel, comprising a crank, a spool connected to said crank, a pull-off brake mechanism and a chassis, the pull-off brake mechanism and the crank being interconnected such that a pretension of the pull-off brake mechanism increases as the crank is moved in a reeling-in direction, wherein the pretension of the pull-off brake mechanism also increases as the crank is moved in a direction opposite to the reeling-in direction, wherein the pull-off brake mechanism comprises a torque converter comprising a crown and a control sleeve said crown and said control sleeve being provided with cooperating protrusions, wherein surfaces between said protrusions of the control sleeve are provided with grooves and surfaces on tops of the protrusions of the crown are provided with equal grooves and wherein balls are positioned between said grooves of the crown and said grooves of the control sleeve.

2. The fishing reel of claim 1, wherein the grooves are deeper in a portion positioned in a centre between the edges of the protrusions.

3. The fishing reel of claim 1, wherein a relative rotation between the crown and the control sleeve results in the crown and control sleeve being pressed apart due to the cooperation of the grooves and the balls.

4. The fishing reel of claim 1, further comprising a pull-off brake adjuster connected to a brake adjusting knob, the pull-off brake adjuster being connected to the torque converter by a main shaft transferring both rotational movements and axial forces from the crank and the pull-off brake adjuster, respectively.

* * * * *